United States Patent [19]
Azarbayejani et al.

[11] Patent Number: 5,511,153
[45] Date of Patent: Apr. 23, 1996

[54] METHOD AND APPARATUS FOR THREE-DIMENSIONAL, TEXTURED MODELS FROM PLURAL VIDEO IMAGES

[75] Inventors: Ali Azarbayejani; Tinsley Galyean; Alex Pentland, all of Cambridge, Mass.

[73] Assignee: Massachusetts Institute of Technology, Cambridge, Mass.

[21] Appl. No.: 183,142

[22] Filed: Jan. 18, 1994

[51] Int. Cl.$^6$ .................................................. G06F 15/00
[52] U.S. Cl. .................................................. 395/119
[58] Field of Search .................................. 395/121–125, 395/119, 127; 382/16, 23; 365/113, 114

[56] References Cited

U.S. PATENT DOCUMENTS

| | | | |
|---|---|---|---|
| 5,214,753 | 5/1993 | Lee et al. | 395/125 |
| 5,255,352 | 10/1993 | Faulk | 395/125 |
| 5,257,346 | 10/1993 | Hanson | 395/125 |
| 5,325,470 | 6/1994 | Sumino et al. | 395/121 |
| 5,363,476 | 11/1994 | Kurashige et al. | 395/125 |
| 5,369,736 | 11/1994 | Kato et al. | 395/125 |

OTHER PUBLICATIONS

Ayache et al., "Maintaining Representations of The Environment Of A Mobile Robot," 5 *IEEE Trans. Robotics Automation* 804 (1989).

Broida et al., "Recursive Estimation Of 3–D Motion From A Monocular Image Sequence," 26 *IEEE Trans. Aerosp. Electron. Syst.* 639 (1990).

Broida et al., "Estimation Of Object Motion Parameters From Noisy Images," 8 *IEEE Trans. Pattern Analysis And Machine Intelligence* 90 (1986).

Dickmanns et al., "Dynamic Monocular Machine Vision," 1 *Machine Vision And Applications* 223 (1988).

Faugeras et al., "Building Visual Maps By Combining Noisy Stereo Measurements," *IEEE Conf. On Robotics And Automation* 1433 (Apr. 1986).

Heel, "Temporally Integrated Surface Reconstruction," in *ICCV '90* (1990).

Kumar et al., "A Non–Linear Optimization Algorithm For The Estimation Of Structure And Motion Parameters," *IEEE Conf. On Computer Vision And Pattern Recognition* 136 (Jun. 1989).

Longuet–Higgins, "A Computer Algorithm For Reconstructing A Scene From Two Projections," 293 *Nature* 61 (1981).

Matthies et al., "Kalman Filter–Based Algorithms For Estimating Depth From Image Sequences" 3 *International Journal Of Computer Vision* 209 (1989).

Poelman et al., "A Paraperspective Factorization Method For Shape And Motion Recovery," CMU–CS–92–208, School Of Computer Science (Oct. 1992).

Soatta et al., "Recursive Motion And Structure Estimation With Complete Error Characterization," *IEEE Conference On Computer Vision And Pattern Recognition* 428 (Jun. 1993).

Szeliski et al., "Recovering 3D Shape And Motion From Image Streams Using Non–Linear Least Squares," *IEEE Conference On Computer Vision And Pattern Recognition* 752 (Jun. 1993).

Excerpt from Brown, *Introduction To Random Signal Analysis And Kalman Filtering* (1983).

(List continued on next page.)

*Primary Examiner*—Phu K. Nguyen
*Attorney, Agent, or Firm*—Cesari and McKenna

[57] ABSTRACT

A method and apparatus for generating three-dimensional, textured computer models from a series of video images of an object is disclosed. The invention operates by tracking a selected group of object features through a series of image frames and, based on changes in their relative positions, estimates parameters specifying camera focal length, translation and rotation, and the positions of the tracked features in the camera reference frame. After segmentation of the images into two-dimensional bounded regions that each correspond to a discrete surface component of the actual object, the texture contained in the various video frames is applied to these regions to produce a final three-dimensional model that is both geometrically and photometrically specified.

26 Claims, 3 Drawing Sheets

OTHER PUBLICATIONS

Excerpt from Gelb, ed., *Applied Optimal Estimation* (1974).

Horn, "Relative Orientation," 4 *International Journal Of Computer Vision* 59 (1990).

Szeliski et al., "Recovering 3D Shape And Motion From Image Streams Using Non-Linear Least Squares," CRL 93/3, Digital Equipment Corporation (Mar. 1993).

Weng et al., "Optimal Motion and Structure Estimation," 15 *IEEE Trans. Pattern Analysis And Machine Intelligence* 864 (1993).

Young et al., "3-D Motion Estimation Using A Sequence Of Noisy Stereo Images: Models, Estimation, and Uniqueness Results," 12 *IEEE Trans. Pattern Analysis And Machine Intelligence* 735 (1990).

Oliensis et al., "Incorporating Motion Error In Multi-Frame Structure From Motion," *IEEE Workshop On Visual Motion* 8 (Oct. 1991).

Sull et al, *Segmentation, Matching and Estimation of Structure and Motion of Textured Piecewise Planar Surfaces*, Visual Motion, 1991, IEEE Workshop, pp. 274-279.

Foley et al, "*Computer Graphics: Principles and Practices,*" Addison-Wesley Publishing Co. (1990), pp. 230-241.

Duffy, N. D., "*Computer Reconstruction of 2-D Photographs from Alternative Viewpoints,*" IEEE Colloq. (1990), No. 087: Electronic Images and Image Processing, pp. 1-4.

Kumar et al, "*A Nonlinear Optimization Algorithm for the Estimation of Structure and Motion,*" Computer Vision and Pattern Recognition, 1989 (CVPR), pp. 136-143.

Ando, Hiroshi, "*Dynamic Reconstruction of 3D Structure and 3D Motion,*" Visual Motion, IEEE Workshop, (1991), pp. 101-110.

Lee, Chi-Yin et al., "*Structure from Motion: A Region Based Approach Using Affine Transformations* and Movement Invariant," Robotics and Automation, 1993 IEEE International Conference, pp. 120-127.

Oliensis, J., et al, "*Incorporating Motion Error in Multi-Frame Structure from Motion,*" IEEE Visual Workshop, 1991, pp. 8-13.

Tsai, Roger et al, "Uniqueness and Estimation of Three-Dimensional Motion Parameters of Rigid Objects with Curved Surfaces," Pattern Analysis and Machine Intelligence, vol. PAMI-6, No. 1, Jan. 1984, pp. 337-351.

Taylor, Camillo et al, "*Structure and Motion In Two Dimensions from Multiple Images: A Least Squares Approach,*" Visual Motion, IEEE Workshop, 1991, pp. 242-248.

Wang, Han et al, "A Structure-from-motion Algorithm for Robot Vehicle Guidance", Intelligent Vehicles, 1992 Symposium Proceedings, pp. 30-35.

METHOD AND APPARATUS FOR THREE-DIMENSIONAL, TEXTURED MODELS FROM PLURAL VIDEO IMAGES

BACKGROUND OF THE INVENTION

1. Field of the Invention

The present invention relates to electronic image representation, and more particularly to a system and method for recovering the shape and texture of objects recorded on a medium such as videotape, and subsequently producing digitized, three-dimensional models of such objects.

2. Description of the Related Art

The advent of electronic equipment capable of processing digitally encoded pictorial images has substantially extended the computer's reach into traditional print and photographic media. Electronic imaging now includes the ability to digitize an observed scene into individual picture elements, or "pixels," with extremely high fidelity and resolution; to store and manipulate an image at the global or individual pixel level; to control its presentation (e.g., by inserting or withdrawing occlusive image elements, selectively enlarging or reducing selected elements, altering illumination, and translating or rotating objects in real-time); and to analyze elements of the digitally recorded scene through the use of various mathematical and graphical techniques.

"Machine vision" researchers attempt to reproduce computationally the attributes and capabilities of human vision, as well as to extend those capabilities in particular domains. One important goal of such research is to produce, in real-time, a computer model of a scene or object by analysis of its digital representation. That representation might be generated, for example, by digitizing a video segment containing a series of sequential views taken from different angles; the views collectively describe the scene or object in the sense of containing a complete record of all relevant visual elements.

Obtaining a three-dimensional model of an object from such a representation is sometimes called the "structure from motion" ("SfM") problem, since the true object structure must be deduced from successive video frames that reflect not only altered perspective, but also the effects of camera geometry and the videographer's own movements. For example, in making a video recording of a building by walking around its perimeter, the videographer will likely alter her distance from the building in the course of her excursion, and will probably rotate the camera (along any of three possible axes) as well. The SfM system must therefore interpret changing two-dimensional image information in terms both of changing three-dimensional object perspective and relative camera orientation.

To treat this problem mathematically, an arbitrary set of feature points (based, most commonly, on identification of intersecting object curves) is tracked through the sequence of image frames and analyzed numerically. The unknowns in this analysis are the depths of the feature points and the rigid-body transformations between frames. Isolating those elements of interframe inconsistency attributable to object structure rather than camera motion represents a nonlinear task, and is usually approached numerically by minimizing a nonlinear objective function.

Numerical estimation techniques for recovering object structure may be "batch" or "recursive" processes. In a batch process, all data upon which the process operates are initially known, and the process analyzes the data taken as a whole. Batch processes typically minimize nonlinear objective functions on sets of images using, for example, the Levenberg-Marquardt procedure. In a recursive process, by contrast, the image frames are analyzed in a stepwise manner. Each new frame is incorporated into the estimation analysis in accordance with an assigned weight that reflects its statistical contribution. Examples of recursive processes include the Kalman filter, which provides exact linear solutions for purely orthographic images; and the extended Kalman filter ("EKF"), which linearizes, within a local region, a nonlinear state vector that describes perspective images in order to permit application of the Kalman filter to the resulting approximation.

Although batch processes have been reported to exhibit substantial stability and rapid convergence to a solution, the computational procedures tend to be quite complex, and batch processing by definition precludes in-situ operation (since all the data must be gathered in advance of the numerical analysis). Unfortunately, current statistically based, recursive processes (including those based on the EKF) have failed to exhibit equivalent accuracy and robustness.

Furthermore, prevailing estimation methods—both batch and recursive—require prior knowledge of camera focal length (i.e., assume the use of a calibrated camera) to provide an estimation of metric geometry; in other words, focal length is a required parameter for the statistical estimation process, and cannot be recovered from that process. Existing video, from an unknown camera, therefore cannot be processed using these techniques. Current methods also tend to be specific either to orthographic or perspective image representation, but do not accommodate both.

Figure 1:
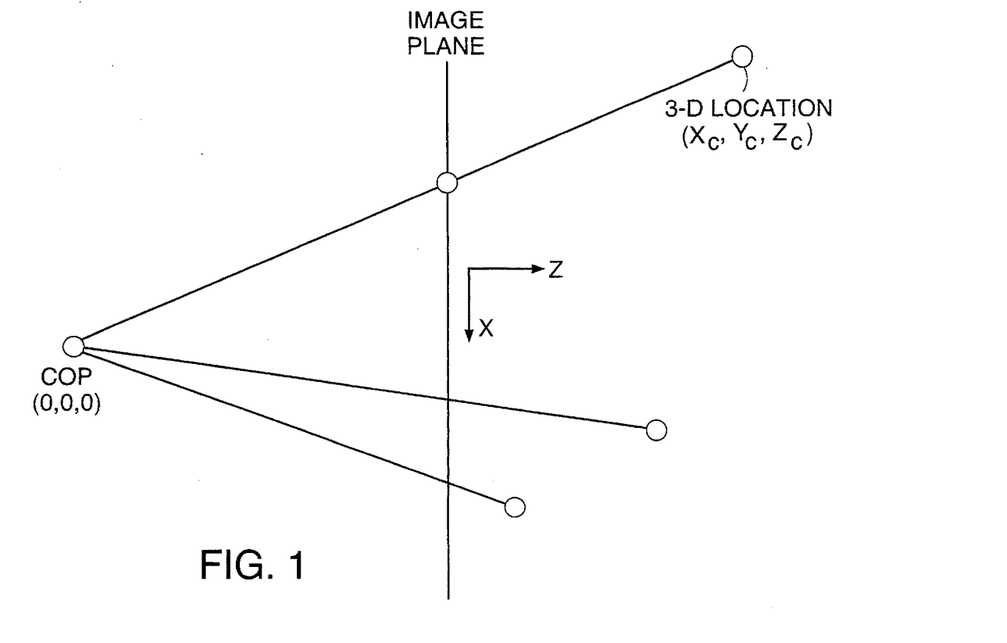
FIG. 1 depicts a conventional central-projection coordinate geometry.

In a typical implementation, the relationship between the image location (i.e., the scene as it appears in two dimensions to the camera) and the actual three-dimensional location within the recorded scene is described in terms of central-projection geometry. This geometric model, illustrated in FIG. 1, can be represented by the equation $$\begin{pmatrix} u \\ v \end{pmatrix} = \begin{pmatrix} X_C \\ Y_C \end{pmatrix} \frac{f}{Z_C}$$

where u,v specifies the location of an image feature in the image plane, f is the camera focal length, and $X_C$, $Y_C$, $Z_C$ specify the location of the object in the camera reference frame (i.e., the true spatial location relative to the current camera location). In other words, the geometric coordinate system is defined with respect to the center of projection located behind the image frame. Many SfM techniques utilize three unknown parameters—i.e., $X_C$, $Y_C$, $Z_C$—for each object point. However, this representational mode inevitably leaves at least some parameters undetermined regardless of the number of feature points that are tracked. Thus, although one might intuitively assume that tracking more feature points increases the accuracy of the ultimate estimation, in fact just the opposite is the case. This is due to the fact that for N tracked feature points, there exist six motion parameters (corresponding to camera rotation and translation toward and away from the object) and 3N structure parameters (the three points specifying the $X_C$, $Y_C$, $Z_C$ location), versus 2N constraints (the observed u,v locations) plus one arbitrarily set scale constraint. The system is therefore underdetermined for any N, with the counterintuitive property that adding tracked features actually augments the degree of indeterminacy.

At the conclusion of the estimation process, when changes in relative distance among the tracked features have been fully analyzed, current SfM systems compute the three-dimensional geometry of the object by identifying feature planes. The user, or a suitable computer program, then "segments" these planes by identifying vertices, thereby creating a series of connected polygons that provide a skeletal outline of the object. As far as we are aware, current systems do not provide for recovery of further image detail.

DESCRIPTION OF THE INVENTION

Objects of the Invention

Accordingly, it is an object of the present invention to generate three-dimensional computer models from video without prior knowledge of camera geometry, thereby obviating the need for a calibrated camera.

It is a further object of the invention to apply texture to the three-dimensional computer models in a manner faithful to the recorded object.

It is another object of the invention to generate three-dimensional computer models based on perspective and orthographic projection, thereby enabling accurate modeling over a wide range of camera focal lengths.

It is yet another object of the invention to generate highly accurate three-dimensional computer models using recursive statistical estimation techniques that can be executed rapidly.

Yet another object of the invention is to generate highly accurate three-dimensional computer models using a small number of tracked feature points.

Still another object of the invention is to implement a mathematical representation for generation of three-dimensional computer models in which a relatively small number of tracked feature points ensures that measurements outnumber degrees of freedom, thereby facilitating a stable estimation.

It is yet another object of the invention to generate highly accurate three-dimensional computer models based on orthographic or perspective image representations.

Other objects will, in part, be obvious and will, in part, appear hereinafter.

The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

Brief Summary of the Invention

The present invention operates by tracking a selected group of object features through a series of image frames and, based on changes in their relative positions, estimates parameters specifying camera focal length, translation and rotation, and the positions of the tracked features in the camera reference frame. After segmentation of the images into two-dimensional bounded regions that each correspond to a discrete surface component of the actual object, the texture contained in the various video frames is applied to these regions to produce a final three-dimensional model that is both geometrically and photometrically specified.

Our estimation process operates on a central-projection coordinate geometry that differs from the representation typically employed in the prior art. We fix the coordinate-system origin at the image plane, rather than at the center of projection, and utilize the inverse focal length as a model parameter instead of the actual focal length. Our representation permits simplified mapping from the image location to the three-dimensional location, and decouples, for purposes of analysis, the representation of camera geometry from the representation of object depth.

We employ this central-projection geometry in our parameterizations of camera translation and rotation. As discussed herein, our use of inverse focal length allows robust estimation of camera translation across a wide range of focal lengths, while our coordinate geometry enables us to represent the three-dimensional location of an object feature using a single parameter.

To estimate state parameters from frame-by-frame differences in relative feature positions, we utilize the extended Kalman filter formalism, but employ a state vector that permits recovery of camera focal length. In this way, we are able to generate three-dimensional models from uncalibrated video; our invention, unlike the prior art, does not require prior knowledge of camera geometry.

After estimation of structure and motion parameters, the video-recorded object is preferably decomposed into piecewise smooth surfaces. Structure and motion parameters are used to impart spatial meaning to the surfaces, and to map object feature details from digitized video frames to the surfaces. After final processing, these surfaces, represented as electronically stored pixelmaps whose relationship to actual object surfaces is geometrically specified, collectively define the object and may be scaled, translated, rotated, shaded and selectively illuminated using currently available computer-aided design ("CAD") software.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

A. Representation

We first describe our mathematical descriptions for geometric data related to scene structure, camera motion and camera geometry.

1. Camera Model

Figure 2:
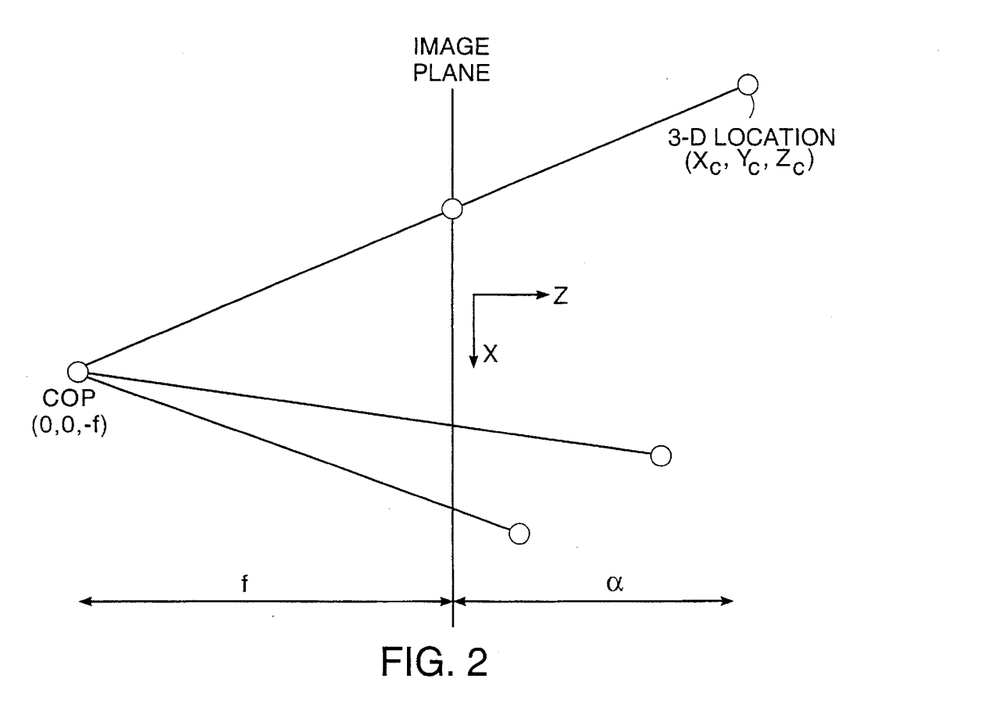
FIG. 2 depicts an alternative central-projection coordinate geometry in accordance with the present invention.

Refer to FIG. 2, which illustrates a central-projection coordinate system in accordance with the present invention. Unlike the conventional representation, shown in FIG. 1, the origin is fixed at the image plane rather than at the center of projection. Furthermore, we represent the illustrated model with the equation $$\begin{pmatrix} u \\ v \end{pmatrix} = \begin{pmatrix} X_C \\ Y_C \end{pmatrix} \frac{1}{1 + Z_C \beta}$$

where $\beta$ is the inverse focal length, $1/f$.

One important property of this model is that it fully decouples the representation of the camera from the representation of depth. In the conventional model, fixing the "depth" $Z_C$ of an object and altering the focal length f does not affect the imaging geometry; only the scale of the image changes. Conversely, this model does not permit alteration of imaging geometry without also altering the representation of depth. Thus the parameter $Z_C$ actually encodes both camera imaging geometry and depth, while f is no more than a scale factor from world units to pixels.

On the other hand, altering the inverse focal length $\beta$ in our model affects the imaging geometry in a manner independent 6f object depth. This is critical in the context of the present invention, where focal length is recovered by the estimation process along with image-feature depth. Decoupling the camera parameter from structure and motion parameters enables each of these to be managed independently.

In addition, this geometric model does not become mathematically unwieldy as the focal length becomes large. Indeed, orthographic projection, which constitutes an unrepresentable theoretical limit in the conventional central-projection geometry, is straightforwardly expressed with finite parameters ($\beta=0$) in our model. Thus, all theoretical results that hold for general values of $\beta$ apply uniformly to both perspective and orthographic projection, two cases which are traditionally treated quite differently in computer vision research.

2. Structure Model

By "structure" we refer to a mathematical description of the location of an image feature in the camera reference frame. Each feature point is defined in terms of its image-frame (u,v) location in the first video frame in which it appears. Feature tracking results in accumulation of (usually) different image-frame locations from subsequent frames. The precise type method of feature tracking is not critical to the present invention, and many suitable techniques are available and well-known to those skilled in the art. In a preferred implementation, tracking is performed using normalized correlation of image-based templates as described in Horn, *Robot Vision* (1986), relevant portions of which are hereby incorporated by reference. For purposes of subsequent calculations, we prefer to assume that feature tracking is noisy with zero-mean errors.

The true physical location in space of an image feature is specified using the u,v location scaled by the parameter $\alpha$, shown in FIG. 2, and which corresponds to the length along the Z-axis to the image feature:

$$\begin{pmatrix} X \\ Y \\ Z \end{pmatrix} = \begin{pmatrix} u \\ v \\ 0 \end{pmatrix} + \alpha \begin{pmatrix} u\beta \\ v\beta \\ 1 \end{pmatrix}$$

In the foregoing equation, the first term represents the image location and the second term represents the perspective ray scaled by the unknown depth $\alpha$. Accordingly, we are able to represent the spatial location of an image feature with a single parameter, so that constraints outnumber unknowns with as few as seven tracked features; in other words, a stable estimation is possible with as few as seven points (although, because additional points further overdetermine the system, tracking more features enhances ultimate accuracy). We represent the pointwise structure of an object with the N-parameter vector $$(\text{structure}) = \begin{pmatrix} \alpha_1 \\ \cdot \\ \cdot \\ \cdot \\ \alpha_N \end{pmatrix}$$

3. Translation Model

Because it is unlikely, under ordinary conditions, that a videographer will remain perfectly equidistant from the object throughout the recording, it is necessary to parameterize translation of the camera reference frame relative to the object reference frame along all three directional axes. Translation is ordinarily represented with the vector $$t = \begin{pmatrix} t_X \\ t_Y \\ t_Z \end{pmatrix}$$

where the $t_X$ and $t_Y$ components correspond to directions parallel to the image plane, while the $t_Z$ component corresponds to depth of the object along the optical axis.

Accordingly, sensitivity of the model to $t_X$ and $t_Y$ motion will be similar, while sensitivity to $t_Z$ motion will differ therefrom to a degree that depends on the focal length of the imaging geometry. For typical video-camera focal lengths, even with wide-angle lenses, the contribution of $t_Z$ motion to interframe feature-point movements will ordinarily be far less than that resulting from $t_X$ and $t_Y$ motion, and the contribution of $t_Z$ motion diminishes still further with increasing focal length; in the limiting orthographic case there is zero image-plane sensitivity to $t_Z$ motion.

For this reason, we do not represent $t_Z$ explicitly in our estimation process. Instead, we represent this component with the parameter $t_Z\beta$, and we parameterize translational motion with the vector:

$$(\text{translation}) = \begin{pmatrix} t_X \\ t_Y \\ t_Z\beta \end{pmatrix}.$$

A clear advantage of this form of representation is that the sensitivity of $t_Z\beta$ does not degenerate at long focal lengths as does $t_Z$, enabling estimation of $t_Z$ motion up to the orthographic limit. Following estimation, the true translation t can be recovered simply by dividing out the focal parameter from $t_Z\beta$.

4. Rotation Model

In addition to translational motion, it is also necessary to provide for the likelihood that the videographer will rotate the camera about the three directional axes during recording. Parameterizing the rotation between camera and object reference frames can be quite problematic, since the different rotational elements are coupled and therefore cannot be estimated independently. Rotation is represented using a unit quaternion $$R = \begin{pmatrix} q_0 \\ q_1 \\ q_2 \\ q_3 \end{pmatrix}$$

which specifies the angular extent of rotation about three axes. From this quaternion the rotation matrix R=

$$\begin{pmatrix} q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{pmatrix}$$

can be generated.

Only a nonlinear constrained minimization will work to directly recover the quaternion from the estimation process. However, because the EKF utilizes a linearization at each step, it would not be possible to rigidly enforce the nonlinear normality constraint throughout the EKF calculations. Indeed, attempts to utilize the quaternion itself in the state vector without constraint to unity length have resulted in complete failure to obtain convergence. See Broida et al., 26 *IEEE Trans. Aerosp. Electron. Syst.* 639 (1990).

We therefore employ a three-parameter incremental rotation representation (similar to that proposed in Broida et al., 8 *IEEE Trans. Pattern Analysis and Machine Intelligence* 90 [1986]) to estimate interframe rotation at each frame. Euler angles about the X-, Y- and Z-axes, which are approximately independent for small rotations, can be used reliably in a system linearization.

The incremental interframe rotation quaternion, $\delta q$, is a function of the three Euler angles $\omega_x$, $\omega_y$, $\omega_z$ as follows:

$$\delta q = \begin{pmatrix} \sqrt{1-\epsilon} \\ \omega_X/2 \\ \omega_Y/2 \\ \omega_Z/2 \end{pmatrix}$$

where $\epsilon = (\omega_x^2 + \omega_y^2 + \omega_z^2)/4$

The interframe rotation can be computed at each frame and then composed with an external rotation quaternion to maintain an estimate of global rotation. Thus, only the interframe rotation $$(\text{interframe rotation}) = \begin{pmatrix} \omega_X \\ \omega_Y \\ \omega_Z \end{pmatrix}$$

is represented in the EKF state vector, while the global rotation quaternion R is used in the linearization process but outside the formal EKF operations. Specifically, at each frame the Euler angles are estimated using the EKF, which utilizes both the Euler angles and the current value of R in the linearization step; thereafter the Euler angles are used to update R, and are then reset to zero.

5. Transformation Between Camera and Object Frames

As noted previously, the true physical location of an image feature is specified using the u,v location scaled by the parameter $\alpha$. Based on the foregoing representations of translation and rotation, it is possible to relate the location of any point in the current camera reference frame to a true physical location (X, Y, Z) according to the transformation $$\begin{pmatrix} X_C \\ Y_C \\ Z_C\beta \end{pmatrix} = \begin{pmatrix} t_X \\ t_Y \\ t_Z\beta \end{pmatrix} + \begin{pmatrix} 1 & & \\ & 1 & \\ & & \beta \end{pmatrix} R \begin{pmatrix} X \\ Y \\ Z \end{pmatrix}$$

6. Scale

It is well-known that the shape and motion geometry in typical SfM problems are subject to arbitrary scaling, and that this factor cannot be recovered. In two-frame problems with no information about true lengths in the scene, the scale factor is usually set to the magnitude of the translation vector between the two frames. In other formulations, some component of the translational motion between the first two frames is fixed at a finite value. All of these approaches are ill-advised for two reasons. First, if the selected translation magnitude turns out to be zero, the numerical integrity of the estimation will be compromised. Second, because every component of motion is generally dynamic, the scale typically changes every frame; reliance on any particular interframe parameter is therefore numerically inappropriate and potentially disastrous for stability.

We therefore choose to set scale according to a reliably static parameter. Since photographed objects are assumed to be rigid and the tracked features rigidly connected, all of the $\{\alpha_i\}$ parameters will be static. Accordingly, any of these can furnish a uniform scale for all motion and structure parameters over the entire estimation process to provide a well-conditioned, stable representation. In our EKF implementation, setting the initial statistical variance of any $\alpha i$ (e.g., $\alpha_0$) to zero results in automatic scaling of the other $\alpha_i$ parameters to accommodate this constraint.

B. Estimation

Our composite state vector x upon which the EKF operates consists of 7+N parameters—six for motion, one for camera geometry, and N for structure, where N is the number of features tracked:

$$x = \begin{pmatrix} t_X \\ t_Y \\ t_Z\beta \\ \omega_X \\ \omega_Y \\ \omega_Z \\ \beta \\ \alpha_1 \\ \vdots \\ \alpha_N \end{pmatrix}$$

As noted previously, an additional quaternion is required to maintain a description of global rotation.

The estimation process assigns a three-dimensional location of each point based on its position within the image frame; in other words, since each point's u,v position is known, the estimation process must deduce the length of the ray extending from u,v to X, Y, Z. The EKF examines the state represented by each frame, assigning an appropriate statistical weight to each state as it is integrated into the analysis, to determine which state parameters have contributed to the changes between states and to what extent. This is accomplished by locally linearizing the various state parameters and, based on the linearization, estimating the succeeding state. The difference between the estimate and the actual next state is used to refine the statistics underlying the succeeding estimate.

The EKF operates according to a linear dynamics model, the precise nature of which is not critical in our implementation; unless prior information on dynamics is available, we utilize a simple identity transform plus noise. A suitable model is given by $$x(t+1)=\Phi(t)x(t)+w(t)$$

where $$\Phi(t)=I$$

and $$w(t)$$

is an error term, modelled as Gaussian-distributed white noise.

The image-frame observations at each state, or time step, can be represented by the state vector $$y(t) = \begin{pmatrix} y_1(t) \\ \cdot \\ \cdot \\ \cdot \\ y_N(t) \end{pmatrix}$$

where each y value is specified by the observed u,v locations. In our EKF implementation, the notation $\hat{x}(t_1|t_2)$ represents the linear least squares estimate (LLSE) of $x(t_1)$ (i.e., a prediction of the current state at $t_1$) given measurements of y for all states up to and including $t_2$. The notation $$P(t_1|t_2)=E(x(t_1)-\hat{x}(t_1|t_2))(x(t_1)-\hat{x}(t_1|t_2))^T$$

represents the error covariance of the LLSE. In other words, the function $P(t_1|t_2)$ represents an estimate of the validity of the state function at $t_1$, based on observations through $t_2$.

Each EKF iteration solves update equations that determine new values of P and an LLSE estimate of the current state vector (($\hat{x}(t|t)$ and $P(t|t)$, respectively) based on current statistics, local linearization operations, and predictions of the current state based on previous values of P and $\hat{x}$. The update equations are $$\hat{x}(t|t)=\hat{x}(t|t-1)+K(t)(y(t)-h\ (\hat{x}(t|t-1)))$$

and $$P(t|t)=(I-K(t)C(t))P(t|t-1)$$

where the function h maps the state-vector parameters associated with a feature point to a u,v image-plane location (according to the transformation discussed in section A(5) above and the relationship between u,v coordinates and camera-reference-frame locations described earlier), and the Kalman gain K(t) is defined as $$K(t)=P(t|t-1)C^T(t)(C(t)P(t|t-1)C^T(t)+R(t))^{-1}$$

and $$C(t) \stackrel{\Delta}{=} \left[ \frac{\partial h}{\partial x} \right]_{x=\hat{x}(t|t-1)}$$

where $R(t)=E\eta(t)\eta^T(t)$, $E\eta(t)=0$, and $\eta(t)$ is a random variable that expresses the uncertainty in the model, and is modelled as Gaussian-distributed white noise.

The prediction step is $$\hat{x}(t+1|t)=\Phi(\Delta t)\hat{x}(t|t)$$

$$P(t+1|t)=\Phi(\Delta t)P(t|t)\Phi(\Delta t)^T+Q(t)$$

where $$Q(t)=E\xi(t)\xi^T(t) \text{ and } E\xi(t)=0.$$

As mentioned previously, an additional computation is required to maintain the global representation of rotation. This computation is performed at both the update and prediction steps. Specifically, before the computation of $\hat{x}(t|t)$, the Euler angles in $\hat{x}(t|t-1)$ are extracted and used to increment the global rotation quaternion R. The Euler angles are then zeroed in $\hat{x}(t|t-1)$ before computing the update. A similar step is taken before computation of $\hat{x}(t+1|t)$. As a result, the Euler angles remain small, preserving the validity of the assumption that they are approximately independent.

C. Model Generation

The foregoing estimation process, which recovers structure and motion from uncalibrated video, is represented as step 10 in FIG. 3; its results are used to compute model geometry and create texture maps, as further described below. Before these stages in the modelling process are reached, however, it is first necessary to decompose the object into piecewise smooth surfaces.

1. Image Segmentation

Figure 3:
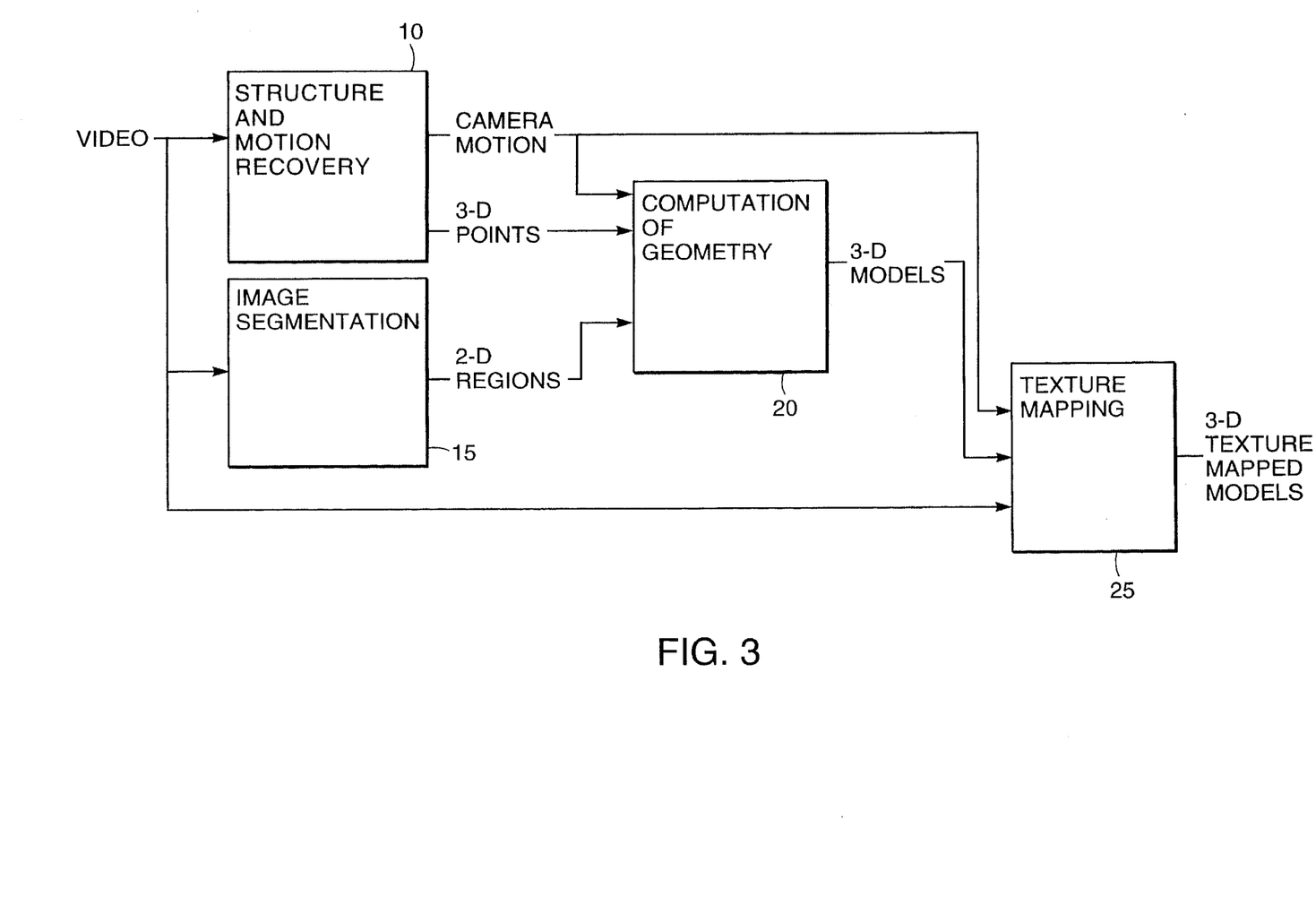
FIG. 3 is a block diagram that illustrates the method of the present invention.

Such surfaces are obtained from the original video by "segmentation," shown at step 15 of FIG. 3. Segmentation refers to the process of decomposing images of the object into bounded two-dimensional regions, each of which can be represented using a single parameterized surface. In step 20, feature points in each region are used to compute surface parameters—that is, to specify the spatial location, orientation and scale of the surface—using the estimates of three-dimensional spatial point locations generated by the EKF. The borders of each region provide a geometric specification of the three-dimensional model.

Segmentation can be performed manually, using standard graphics software, or computationally through the use of specialized software. In the simpler manual implementation, coplanar elements are visually located and bounded based on a selected geometric representation. The preferred representation utilizes polygons to represent the various surface elements; a polygon may be defined by selecting, from the digital representation of one or more video frames, pixels corresponding to the vertices.

To compute geometry (step 20), tracked feature points (whose spatial positions have been recovered by the estimation process) within the polygon are used to compute vectors that define the spatial depth and orientation of a plane that includes the polygon. The selected vertices are then "back-projected"— i.e., mathematically located on the plane using the camera-to-object frame transformation enabled by the estimation process—and connected to define the polygon. The full set of polygons, mathematically represented as just described, together with the vectors that specify their depth, orientation and scale, collectively provide a complete geometric specification of the object that may be scaled, moved, rendered and self-consistently manipulated using standard graphics software and/or hardware.

2. Texture Map Recovery

Point-by-point elements of the individual image frames can be back-projected onto the geometrically defined surface elements to reproduce object surface features—i.e., "texture"—within those elements. This process, shown at step 25 of FIG. 3, is referred to as "texture map recovery," and adds the photometric component to the geometrically specified surfaces. Once again, back-projection of individual pixel elements from the image frames to the surface elements is accomplished using the measurement function h, which is based on recovered camera motion and focal length and relates u,v coordinates to true spatial locations. The edges of the surface elements are used to define an area of a pixelmap (e.g., in the case of polygons, by pointwise superimposition), and once the pixelmap pixel corresponding to an image-frame pixel is located, the red, green and blue values from the image-frame pixel are used to define the mapped pixel. This pixelmap is hereafter referred to as the "texture map."

When multiple video images of the same surface are available, it is advantageous to use all of these in order to build up the most complete and accurate texture map possible. The process of mapping from image frames to object surfaces is inverse to the three-dimensional electronic image rendering performed by graphics processing systems, wherein a two-dimensional representation of a three-dimensional object is created by mapping pixel locations from object surfaces to the image plane. In our process, pixels are mapped from the digitized video images, which are inherently two-dimensional, to the appropriate location on the object surfaces based on camera location, orientation and geometry for each video image (as specified by the measurement function h) and the vector-defined spatial location and orientation of the object surfaces; pixels are then mapped into the texture map corresponding to that object surface. In other words, because the segmented two-dimensional regions have been given spatial "identities" by the vectors that specify the depth and orientation of the corresponding three-dimensional object regions, mapping video-image points to true spatial positions also permits their location in the texture map representing that two-dimensional region.

In most cases, the resolution of the texture map—that is, the number of pixels per unit area available on the pixelmap—significantly exceeds the image information available from a single video frame, resulting in sparse sampling of the texture map. Sampling density is increased by mapping from multiple video images (utilizing the transformations relating image to object locations that are specific to the individual image frames), particularly if some of the frames have close-up shots of detail areas. The use of multiple video frames may also be necessary to include parts of the object surface that are not visible from any single point of view.

If the texture map still contains pixels that have not been assigned the characteristics of a corresponding pixel from a video image, these texture-map gaps can be filled in by suitable image-processing techniques such as bilinear interpolation from one or more of the source video images. In particular, a set of four points surrounding a gap in the texture map can be treated as the vertices of a warped rectangle—where the degree of warping reflects perspective distortion due to camera skew—each of which possesses a particular color. To fill in the gaps, the quadrilateral defined by the four points is scan converted, interpolating their colors through the filled region.

Alternatively, multiple video frames covering a single object surface can each be used to produce a separate texture map in the manner described above. These texture maps are filled as just described, then combined into a single map that constitutes the final representation. The simplest approach to texture-map combination is to have unassigned pixels from each texture map overwritten by corresponding pixels from other texture maps that have been assigned a color. However, this approach tends to produce information loss that reduces resolution and creates misalignments appearing as discontinuities.

So long as a sufficiently large number of original video frames are available, we prefer instead to average the texture maps. The average is preferably weighted to account for the differences in resolution among the texture maps. Resolution can be estimated, for example, by calculating and comparing the average pixel-to-pixel distance in each texture map, and assigning weights to each map based on the relative average distance. The assigned weight is then applied on a per-pixel basis as the texture maps are combined. A potential drawback of this approach occurs if the source video images are not well-registered; in that case, the averaging process can blur features. Such blur can be reduced by using the median or mode value for each pixel in the final texture map (instead of the weighted average), although smaller features can then disappear.

Using the above-described estimation technique, we have found that camera motion can be recovered with sufficient accuracy to register component texture maps to within a pixel, resulting in a very small amount of blurring using direct averaging. Blurring can be reduced still further by registering texture maps using standard affine transformation techniques or by employing standard morphological or nonlinear image-processing algorithms (such as a median filter).

The final texture map for each surface is preferably stored separately, along with the geometric vectors that specify its spatial location, orientation and scale of the object component it depicts, and the maps are combined for viewing and manipulation using standard graphics processing software and/or hardware.

D. Hardware Implementation

Figure 4:
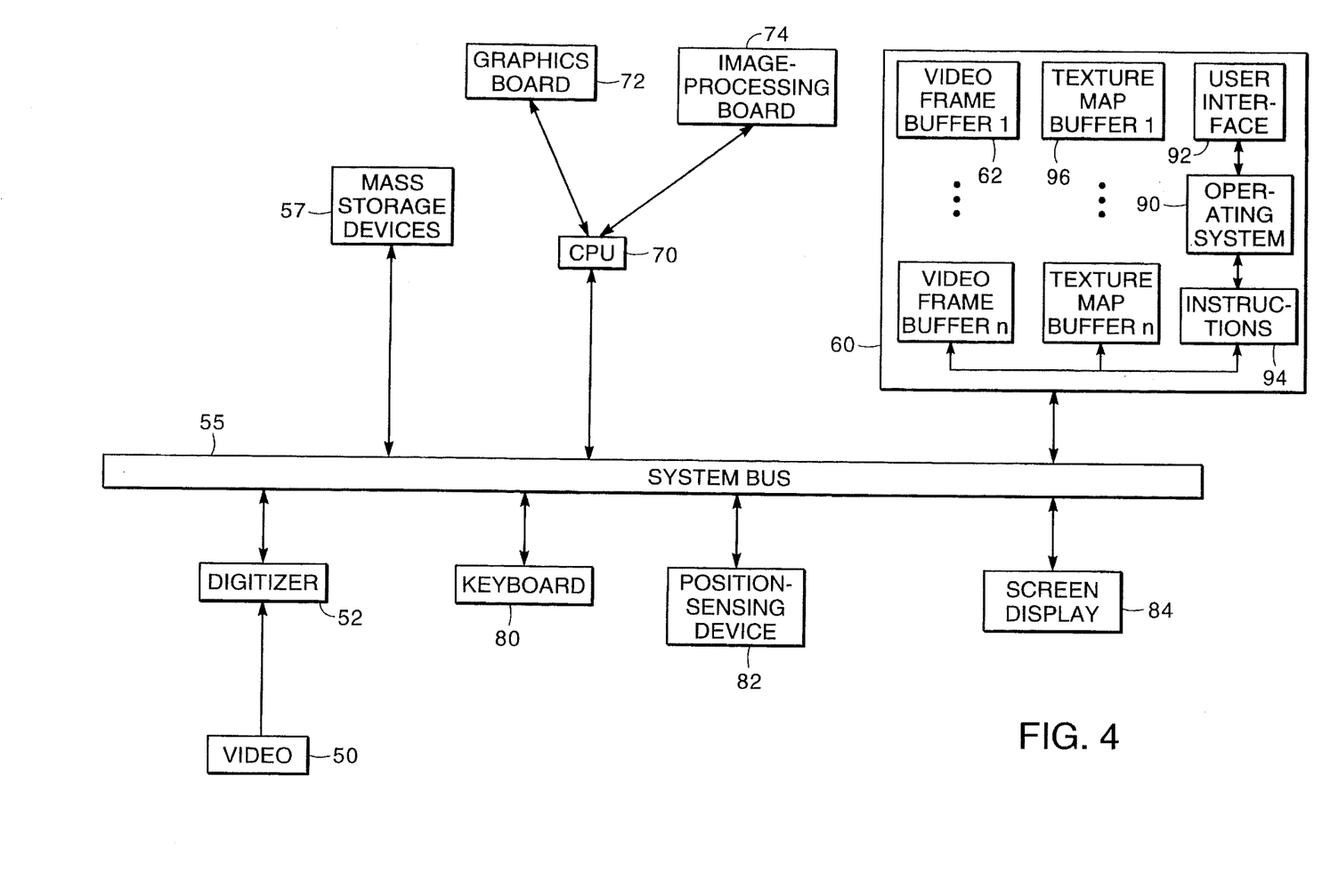
FIG. 4 schematically illustrates a hardware implementation of the present invention.

Refer now to FIG. 4, which illustrates, in block-diagram form, a hardware system incorporating the invention. As indicated therein, the system includes a video source 50, whose output is digitized into pixelmaps by a digitizer 52. The digitized video frames are sent as bitstreams over a system bus 55, over which all system components communicate, and are stored in a mass storage device (such as a hard disk or optical storage unit) 57. During system operation, selected frames are retrieved from mass storage device 57 and loaded into the main system memory 60 (specifically, within a partition defining a series of video frame buffers 62).

The operation of the system is directed by a central-processing unit ("CPU") 70. To facilitate rapid execution of graphical and image-processing operations, the system preferably contains a graphics board 72 and an image-processing board 74; these are standard components well-known to those skilled in the art.

The user interacts with the system using a keyboard 80 and a position-sensing device (e.g., a mouse) 82. The output of either device can be used to designate information or select particular areas of a screen display 84 to direct functions to be performed by the system.

The main memory 60 contains a group of modules that control the operation of CPU 70 and its interaction with the rest of the system. An operating system 90 directs the execution of low-level, basic system functions such as memory allocation, file management and operation of mass storage devices 57. At a higher level, a series of stored instructions 94 direct execution of the primary functions performed by the invention, as discussed below, and instructions defining a user interface 92 allow straightforward interaction over screen display 84. User interface 92 generates words or graphical images on display 84 to prompt action by the user, and accepts user commands from keyboard 80 and/or position-sensing device 82. Software capable of providing a suitable interface is well-characterized in the art.

Each frame buffer 62 defines a "raster," i.e., a regular two-dimensional pattern of discrete pixel positions that collectively define an image and may be used to drive (e.g., by means of image-processing board 74 or an image server) screen display 84 to display that image. The contents of each memory location in a frame buffer directly governs the appearance of a corresponding pixel on display 84.

It must be understood that although the modules of main memory 60 have been described separately, this is for clarity of presentation only; so long as the system performs all necessary functions, it is immaterial how they are distributed within the system and the programming architecture thereof. Likewise, although conceptually organized as grids, pixelmaps need not actually be stored digitally in this fashion. Rather, for convenience of memory utilization and transmission, the raster pattern is usually encoded as an ordered array of pixels.

As noted above, execution of the key tasks associated with the present invention is directed by stored instructions 94, which govern the operation of CPU 70 and control its interaction with main memory 60 in performing the steps necessary to create and display texture maps from source video. Specifically, either the user (by means of interface 92) or an analysis module (contained within instructions 94) selects a series of at least seven (and preferably 20–25) feature points from the first video frame buffer 62. CPU 70 then analyzes succeeding video frames rasters to identify changes in the relative positions of the feature points from frame to frame. Based on these changes and in accordance with operations described previously, CPU 70 estimates parameters specifying camera focal length, translation and rotation, and the three-dimensional spatial locations of the tracked features. CPU 70, with or without assitance from the user, segments the images represented by the video frame buffers 62 into bounded regions that each correspond to a discrete image component and, based on the estimated parameters, associates each bounded region with a geometry vector specifying its location and orientation in space and its scale. CPU 70 then utilizes these regions to define the borders of a second series of frame buffers 96, which contain the texture maps.

Once again utilizing procedures described above, CPU 70 extracts texture information from video frame buffers 62 and applies this to buffers 96 based on the known spatial location of the texture and the geometry vectors specifying the spatial characteristics of the bounded regions to frame buffers 96 correspond, thereby creating crude texture maps. CPU 70 then processes the crude texture maps (to fill in gaps and enhance resolution) into final texture maps. These can be manipulated, using standard CAD software and the graphics and image-processing boards 72 and 74, respectively, according to commands entered over user interface 92. Such software will typically allow the user to vary orientation, shading and illumination.

It will therefore be seen that the foregoing represents a novel and advantageous process and apparatus for generating three-dimensional, textured computer models based on digital images obtained from uncalibrated video. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of generating, from a multiple-frame video recording of an object, geometrically specified digital pixelmaps that collectively represent a three-dimensional model of the object, the method comprising the steps of:

a. digitizing each frame of the video recording into a pixelmap;

b. selecting at least seven object features from a first digitized video frame;

c. tracking the features among a plurality of digitized video frames to determine changes in the relative distances therebetween;

d. based on changes in the relative distances, recursively estimating a plurality of unknown parameters including camera focal length, camera translation, camera rotation, and spatial locations of the tracked features;

e. based on the estimated parameters, defining spatial vectors that specify the spatial locations of object details depicted by each pixel of a plurality of digitized video frames; and f. based on the spatial vectors, mapping each pixel from the plurality of digitized video frames to pixel locations within a plurality of final pixelmaps that collectively define a digital representation of the object.

2. The method of claim 1 further comprising the steps of:

a. segmenting the object into a plurality of bounded, two-dimensional object regions having contours;

b. based on the estimated parameters, defining the spatial location and orientation of the object regions; and c. defining the final pixelmaps to possess contours that match those of the object regions.

3. The method of claim 2 wherein the two-dimensional object regions are quadrilaterals.

4. The method of claim 2 wherein pixels from each digitized video frame that contains at least part of an object region are mapped to a separate final pixelmap defined with respect to that object region, and further comprising the steps of:

a. increasing the sampling density of each such final pixelmap by bilinear interpolation; and b. combining the separate final pixelmaps into a composite final pixelmap corresponding to the object region by averaging.

5. The method of claim 4 further comprising the step of registering the separate final pixelmaps prior to combining them into a composite final pixelmap.

6. The method of claim 4 wherein at least some of the registered pixelmaps differ in video resolution and are combined by averaging according to weights derived from differences in video resolution.

7. The method of claim 1 wherein recursive estimation is carried out using an extended Kalman filter.

8. The method of claim 1 wherein tracking is performed by performing a normalized correlation on a plurality of image-based templates.

9. The method of claim 1 further comprising the step of increasing the sampling density of the final pixelmaps by bilinear interpolation.

10. The method of claim 1 wherein pixels from a plurality of digitized video frames are mapped to pixel locations within a single final pixelmap.

11. The method of claim 1 wherein each tracked object feature corresponds to a real object feature in a coordinate system wherein a camera having an unknown focal length lies on a camera plane, the tracked object features lie on an image plane whose distance from the camera plane is equal to the unknown focal length, and an unknown depth parameter $\alpha_i$ specifies, for each tracked object feature i, the distance between the image plane and the real object feature corresponding to the tracked object feature i; and the unknown parameter specifying camera focal length is the inverse focal length $\beta$.

12. The method of claim 11 wherein the unknown parameters specifying camera translation are $t_X$, $t_Y$ and $t_Z\beta$, wherein $t_X$ and $t_Y$ correspond to camera motion parallel to the image plane and $t_Z$ corresponds to camera motion perpendicular to the image plane; the unknown parameters specifying camera rotation are Euler angles $\omega_x$, $\omega_y$, $\omega_z$, corresponding, respectively, to rotation about the two axes parallel to and the axis perpendicular to the image plane; and the unknown parameters specifying spatial locations of the tracked features are the depth parameters $\alpha_i$.

13. The method of claim 12 wherein recursive estimation is carried out using an extended Kalman filter that operates on the parameters $t_X$, $t_Y$, $t_Z\beta$, $\omega_x$, $\omega_y$, $\omega_z$, $\beta$, and $\alpha_i$ for each object feature.

14. A method of generating, from a multiple-frame video recording of an object, geometrically specified digital pixelmaps that collectively represent a three-dimensional model of the object, the method comprising the steps of:
   a. digitizing each frame of the video recording into a pixelmap;
   b. tracking a plurality of features among a plurality of digitized video frames to determine changes in the relative distances therebetween;
   c. based on changes in the relative distances, estimating a plurality of unknown parameters including camera translation, camera rotation, and spatial locations of the tracked features;
   d. segmenting the object into bounded, two-dimensional object regions having contours;
   e. defining final pixelmaps whose contours match those of the object regions;
   f. based on the estimated parameters, defining the spatial location and orientation of the object regions; and
   g. based on the estimated parameters and the spatial location and orientation of the object regions, defining vectors that map object details specified by each pixel of a plurality of digitized video frames to pixel locations within the final pixelmaps.

15. Apparatus for generating, from digital pixelmaps representative of a multiple-frame video recording of an object, geometrically specified, textured pixelmaps that collectively represent a three-dimensional model of the object, the apparatus comprising:
   a. electronic storage means;
   b. means for partitioning the storage means into memory partitions for electronically storing each video-frame pixelmap and a plurality of final pixelmaps;
   b. means for selecting and electronically identifying at least seven object features from a first digitized video frame;
   c. means for tracking the features among a plurality of digitized video frames to determine changes in the relative distances therebetween;
   d. means for recursively estimating, based on changes in the relative distances, a plurality of unknown parameters including camera focal length, camera translation, camera rotation, and spatial locations of the tracked features;
   e. means for defining, based on the estimated parameters, vectors that specify spatial locations of object details specified by each pixel in a plurality of digitized video frames; and
   f. means for mapping, based on the spatial vectors, pixels from the digitized video frames that correspond to a single planar object surface to locations within the final pixelmaps, each final pixelmap being representative of a single object surface.

16. The apparatus of claim 15 wherein the mapping means is also configured to:
   a. segment the object into bounded, two-dimensional object regions having contours;
   b. define, based on the estimated parameters, the spatial location and orientation of the object regions; and
   c. define the final pixelmaps to possess contours that match those of the object regions.

17. The apparatus of claim 16 wherein the two-dimensional object regions are quadrilaterals.

18. The apparatus of claim 16 wherein the mapping means maps pixels from each digitized video frame that contains at least part of an object region to a separate final pixelmap defined with respect to that object region, and further wherein the mapping means is configured to:
   a. increase the sampling density of each such final pixelmap by bilinear interpolation; and
   b. combine the separate final pixelmaps into a composite final pixelmap corresponding to the object region by averaging.

19. The apparatus of claim 18 wherein the mapping means is further configured to register the separate final pixelmaps prior to combining them into a composite final pixelmap.

20. The apparatus of claim 19 wherein wherein at least some of the registered pixelmaps differ in video resolution and the mapping means is further configured to combine the registered pixelmaps by averaging according to weights derived from differences in video resolution.

21. The apparatus of claim 15 wherein each tracked object feature corresponds to a real object feature in a coordinate system wherein a camera having an unknown focal length lies on a camera plane, the tracked object features lie on an image plane whose distance from the camera plane is equal to the unknown focal length, and an unknown depth parameter $\alpha_i$ specifies, for each tracked object feature i, the distance between the image plane and the real object feature corresponding to the tracked object feature i; and the unknown parameter specifying camera focal length is the inverse focal length $\beta$.

22. The apparatus of claim 21 wherein the unknown parameters specifying camera translation are $t_X$, $t_Y$ and $t_Z\beta$, wherein $t_X$ and $t_Y$ correspond to camera motion parallel to the image plane and $t_Z$ corresponds to camera motion perpendicular to the image plane; the unknown parameters specifying camera rotation are Euler angles $\omega_x$, $\omega_y$, $\omega_z$, corresponding, respectively, to rotation about the two axes parallel to and the axis perpendicular to the image plane; and the unknown parameters specifying spatial locations of the tracked features are the depth parameters $\alpha_i$.

23. The apparatus of claim 22 wherein means for recursively estimating operates by means of an extended Kalman filter that operates on the parameters $t_X$, $t_Y$, $t_Z\beta$, $\omega_x$, $\omega_y$, $\omega_z$, $\beta$, and $\alpha_i$ for each object feature.

24. The apparatus of claim 15 wherein the tracking means operates by performing a normalized correlation on a plurality of image-based templates.

25. The apparatus of claim 15 wherein the mapping means is configured to increase the sampling density of the final pixelmaps by bilinear interpolation.

26. The apparatus of claim 15 wherein the mapping means maps pixels from a plurality of digitized video frames to pixel locations within a single final pixelmap.

* * * * *

UNITED STATES PATENT AND TRADEMARK OFFICE
CERTIFICATE OF CORRECTION

PATENT NO. : 5,511,153
DATED : April 23, 1996
INVENTOR(S) : Ali Azarbayejani, et al.

It is certified that error appears in the above-identified patent and that said Letters Patent is hereby corrected as shown below:

In column 1, line 4, before the heading "BACKGROUND OF THE INVENTION", insert:

—This invention was made with government support under Grant Number N00014-93-1-0172 awarded by the Navy. The government has certain rights in this invention.—

Signed and Sealed this

Thirtieth Day of July, 1996

Attest:

BRUCE LEHMAN

Attesting Officer

Commissioner of Patents and Trademarks